US007296129B2

(12) United States Patent
Gower et al.

(10) Patent No.: US 7,296,129 B2
(45) Date of Patent: *Nov. 13, 2007

(54) SYSTEM, METHOD AND STORAGE MEDIUM FOR PROVIDING A SERIALIZED MEMORY INTERFACE WITH A BUS REPEATER

(75) Inventors: Kevin C. Gower, LaGrangeville, NY (US); Kevin W. Kark, Poughkeepsie, NY (US); Mark W. Kellogg, Henrietta, NY (US); Warren E. Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/903,178

(22) Filed: Jul. 30, 2004

(65) Prior Publication Data

US 2006/0026349 A1 Feb. 2, 2006

(51) Int. Cl.
*G06F 12/00* (2006.01)
*G06F 13/00* (2006.01)
*G11C 5/06* (2006.01)

(52) U.S. Cl. .................... 711/167; 711/115; 711/154; 711/156; 711/157; 711/170; 711/101; 710/100; 710/313; 365/63

(58) Field of Classification Search .................. None
See application file for complete search history.

(56) References Cited

U.S. PATENT DOCUMENTS

| 3,825,904 | A | 7/1974 | Burk et al. | |
| 4,028,675 | A | 6/1977 | Frankenburg | ............... 711/106 |
| 4,135,240 | A | 1/1979 | Ritchie | |
| 4,475,194 | A | 10/1984 | LaVallee et al. | ............... 371/10 |
| 4,486,739 | A | 12/1984 | Franaszek et al. | ... 340/347 DD |
| 4,654,857 | A | 3/1987 | Samson et al. | |
| 4,723,120 | A | 2/1988 | Petty, Jr. | ................. 340/825.02 |
| 4,740,916 | A | 4/1988 | Martin | ....................... 364/900 |
| 4,796,231 | A | 1/1989 | Pinkham | ................. 385/189.05 |
| 4,803,485 | A | * | 2/1989 | Rypinski | .................... 370/452 |

(Continued)

FOREIGN PATENT DOCUMENTS

GB   2396711 A   6/2004

(Continued)

OTHER PUBLICATIONS

RedCAN/sup TM/: simulations of two fault recovery algorithms for CAN; Dependable Computing, 2004. Proceedings. 10th IEEE Pacific Rim International Symposium on Mar. 3-5, 2004 pp. 302-311.*

(Continued)

*Primary Examiner*—Hyung Sough
*Assistant Examiner*—Mardochee Chery
(74) *Attorney, Agent, or Firm*—Cantor Colburn LLP; Lynn Augspurger

(57) ABSTRACT

A packetized cascade memory system including a plurality of memory assemblies, a memory bus including multiple segments, a bus repeater module and a segment level sparing module. The bus repeater module is in communication with two or more of the memory assemblies via the memory bus. The segment level sparing module provides segment level sparing for the communication bus upon segment failure.

21 Claims, 10 Drawing Sheets

U.S. PATENT DOCUMENTS

| | | | |
|---|---|---|---|
| 4,833,605 A | 5/1989 | Terada et al. ............... 364/200 |
| 4,839,534 A | 6/1989 | Clasen ....................... 307/269 |
| 4,943,984 A | 7/1990 | Pechanek et al. ........... 375/109 |
| 4,985,828 A | 1/1991 | Shimizu et al. |
| 5,053,947 A | 10/1991 | Heibel et al. ............... 364/200 |
| 5,177,375 A | 1/1993 | Ogawa et al. |
| 5,206,946 A | 4/1993 | Brunk ........................... 710/2 |
| 5,214,747 A * | 5/1993 | Cok ............................ 706/31 |
| 5,265,049 A | 11/1993 | Takasugi |
| 5,265,212 A | 11/1993 | Bruce, II .................... 710/113 |
| 5,287,531 A | 2/1994 | Rogers, Jr. et al. ......... 395/800 |
| 5,347,270 A | 9/1994 | Matsuda et al. ........... 340/2.21 |
| 5,387,911 A | 2/1995 | Gleichert et al. ............. 341/95 |
| 5,394,535 A | 2/1995 | Ohuchi ....................... 711/155 |
| 5,454,091 A | 9/1995 | Sites et al. |
| 5,475,690 A | 12/1995 | Burns et al. ............. 370/105.3 |
| 5,513,135 A | 4/1996 | Dell et al. ..................... 365/52 |
| 5,592,632 A | 1/1997 | Leung et al. ............... 395/306 |
| 5,611,055 A | 3/1997 | Krishan et al. ............. 395/281 |
| 5,613,077 A | 3/1997 | Leung et al. ............... 395/306 |
| 5,627,963 A | 5/1997 | Gabillard et al. ............. 714/42 |
| 5,629,685 A | 5/1997 | Allen et al. ............ 340/825.02 |
| 5,661,677 A | 8/1997 | Rondeau, II et al. |
| 5,666,480 A | 9/1997 | Leung et al. ............... 395/180 |
| 5,764,155 A | 6/1998 | Kertesz et al. ......... 340/825.08 |
| 5,822,749 A | 10/1998 | Agarwal |
| 5,852,617 A | 12/1998 | Mote, Jr. ..................... 714/726 |
| 5,870,325 A | 2/1999 | Nielsen et al. ................ 365/63 |
| 5,872,996 A | 2/1999 | Barth et al. ................. 395/853 |
| 5,926,838 A | 7/1999 | Jeddeloh ..................... 711/167 |
| 5,928,343 A | 7/1999 | Farmwald et al. .......... 710/104 |
| 5,930,273 A | 7/1999 | Mukojima ................... 714/776 |
| 5,973,591 A | 10/1999 | Becjtolsheim et al. ........ 365/52 |
| 5,974,493 A | 10/1999 | Okumura et al. ........... 710/307 |
| 5,995,405 A | 11/1999 | Trick ............................ 365/63 |
| 6,038,132 A | 3/2000 | Tokunaga et al. ........... 361/760 |
| 6,049,476 A | 4/2000 | Laudon et al. ................ 365/52 |
| 6,076,158 A | 6/2000 | Sites et al. |
| 6,078,515 A | 6/2000 | Nielsen et al. ................ 365/63 |
| 6,096,091 A | 8/2000 | Hartmann ..................... 716/17 |
| 6,128,746 A | 10/2000 | Clark et al. ................. 713/324 |
| 6,170,047 B1 | 1/2001 | Dye |
| 6,170,059 B1 | 1/2001 | Pruett et al. |
| 6,173,382 B1 | 1/2001 | Dell et al. ................... 711/170 |
| 6,215,686 B1 | 4/2001 | Deneroff et al. .............. 365/52 |
| 6,219,288 B1 | 4/2001 | Braceras et al. |
| 6,260,127 B1 | 7/2001 | Olarig et al. ............... 711/167 |
| 6,262,493 B1 | 7/2001 | Garnett |
| 6,292,903 B1 | 9/2001 | Coteus et al. ............... 713/401 |
| 6,301,636 B1 | 10/2001 | Schultz et al. .............. 711/108 |
| 6,317,352 B1 | 11/2001 | Halbert et al. ................ 365/52 |
| 6,321,343 B1 | 11/2001 | Toda ........................... 713/600 |
| 6,338,113 B1 | 1/2002 | Kubo et al. ................. 711/105 |
| 6,370,631 B1 | 4/2002 | Dye |
| 6,378,018 B1 | 4/2002 | Tsern et al. .................. 710/129 |
| 6,381,685 B2 | 4/2002 | Dell et al. |
| 6,393,528 B1 | 5/2002 | Arimilli et al. |
| 6,473,836 B1 | 10/2002 | Ikeda |
| 6,477,614 B1 | 11/2002 | Leddige et al. |
| 6,483,755 B2 | 11/2002 | Leung et al. .......... 365/189.05 |
| 6,484,271 B1 | 11/2002 | Gray |
| 6,487,627 B1 | 11/2002 | Willke et al. ............... 710/306 |
| 6,493,250 B2 * | 12/2002 | Halbert et al. ................ 365/63 |
| 6,496,540 B1 | 12/2002 | Windmer .................... 375/242 |
| 6,496,910 B1 | 12/2002 | Baentsch et al. |
| 6,499,070 B1 | 12/2002 | Whetsel |
| 6,502,161 B1 | 12/2002 | Perego et al. ................... 711/5 |
| 6,510,100 B2 | 1/2003 | Grundon et al. ............ 365/233 |
| 6,513,091 B1 | 1/2003 | Blackmon et al. .......... 710/316 |
| 6,526,469 B1 | 2/2003 | Drehmel et al. ............ 710/306 |
| 6,546,359 B1 | 4/2003 | Week ........................... 702/186 |
| 6,549,971 B1 | 4/2003 | Cecchi et al. ............... 710/306 |
| 6,553,450 B1 | 4/2003 | Dodd et al. ................. 711/105 |
| 6,557,069 B1 | 4/2003 | Drehmel et al. ............ 710/307 |
| 6,564,329 B1 | 5/2003 | Cheung et al. |
| 6,587,912 B2 | 7/2003 | Leddige |
| 6,611,905 B1 | 8/2003 | Grundon et al. ............ 711/167 |
| 6,622,217 B2 | 9/2003 | Gharachorloo et al. ..... 711/141 |
| 6,625,687 B1 | 9/2003 | Halbert et al. .............. 711/105 |
| 6,625,702 B2 | 9/2003 | Rentschler et al. |
| 6,628,538 B2 | 9/2003 | Funaba et al. ................. 365/63 |
| 6,631,439 B2 | 10/2003 | Saulsbury et al. |
| 6,671,376 B1 | 12/2003 | Koto et al. .................. 380/210 |
| 6,697,919 B2 | 2/2004 | Gharachorloo et al. ..... 711/141 |
| 6,704,842 B1 | 3/2004 | Janakiraman et al. |
| 6,721,944 B2 | 4/2004 | Chaudhry et al. |
| 6,738,836 B1 | 5/2004 | Kessler et al. |
| 6,741,096 B2 | 5/2004 | Moss |
| 6,766,389 B2 | 7/2004 | Hayter et al. |
| 6,775,747 B2 | 8/2004 | Venkatraman |
| 6,791,555 B1 | 9/2004 | Radke et al. |
| 6,839,393 B1 | 1/2005 | Sidiropoulos ............... 375/371 |
| 6,877,076 B1 | 4/2005 | Cho et al. |
| 6,877,078 B2 | 4/2005 | Fujiwara et al. |
| 6,889,284 B1 | 5/2005 | Nizar et al. |
| 6,938,119 B2 | 8/2005 | Kohn et al. |
| 6,949,950 B2 | 9/2005 | Takahashi et al. |
| 2001/0000822 A1 | 5/2001 | Dell et al. ................... 711/170 |
| 2001/0003839 A1 | 6/2001 | Kondo |
| 2002/0019926 A1 | 2/2002 | Huppenthal et al. .......... 712/15 |
| 2002/0038405 A1 | 3/2002 | Leddige et al. |
| 2002/0083255 A1 | 6/2002 | Greeff et al. ............... 710/305 |
| 2002/0103988 A1 | 8/2002 | Dornier |
| 2002/0112119 A1 | 8/2002 | Halbert et al. |
| 2002/0124195 A1 | 9/2002 | Nizar |
| 2002/0147898 A1 | 10/2002 | Rentschler et al. |
| 2002/0174274 A1 | 11/2002 | Wu et al. |
| 2003/0033364 A1 | 2/2003 | Garnett et al. .............. 709/203 |
| 2003/0056183 A1 | 3/2003 | Kobayahi |
| 2003/0084309 A1 | 5/2003 | Kohn .......................... 713/189 |
| 2003/0090879 A1 | 5/2003 | Doblar et al. ............... 361/728 |
| 2003/0223303 A1 | 12/2003 | Lamb et al. ........... 365/230.06 |
| 2003/0236959 A1 | 12/2003 | Johnson et al. ............. 711/167 |
| 2004/0006674 A1 | 1/2004 | Hargis et al. ............... 711/156 |
| 2004/0049723 A1 | 3/2004 | Obara ......................... 714/729 |
| 2004/0117588 A1 | 6/2004 | Arimilli et al. |
| 2004/0128474 A1 * | 7/2004 | Vorbach ....................... 712/10 |
| 2004/0205433 A1 | 10/2004 | Gower et al. |
| 2004/0230718 A1 | 11/2004 | Polzin et al. |
| 2004/0246767 A1 | 12/2004 | Vogt |
| 2004/0250153 A1 | 12/2004 | Vogt ........................... 713/500 |
| 2004/0260909 A1 | 12/2004 | Lee et al. |
| 2004/0260957 A1 | 12/2004 | Jeddeloh et al. |
| 2005/0023560 A1 | 2/2005 | Ahn et al. ................... 257/200 |
| 2005/0044457 A1 | 2/2005 | Jeddeloh |
| 2005/0050237 A1 | 3/2005 | Jeddeloh |
| 2005/0050255 A1 | 3/2005 | Jeddeloh |
| 2005/0066136 A1 | 3/2005 | Schnepper |
| 2005/0080581 A1 | 4/2005 | Zimmerman et al. |
| 2005/0097249 A1 | 5/2005 | Oberlin et al. |
| 2005/0120157 A1 * | 6/2005 | Chen et al. .................. 710/313 |
| 2005/0125702 A1 | 6/2005 | Huang et al. |
| 2005/0125703 A1 | 6/2005 | Lefurgy et al. |
| 2005/0144399 A1 | 6/2005 | Hosomi |
| 2005/0177690 A1 | 8/2005 | LaBerge |
| 2005/0204216 A1 | 9/2005 | Daily et al. ................. 714/724 |
| 2005/0257005 A1 | 11/2005 | Jeddeloh |

2005/0259496 A1  11/2005  Hsu et al.

FOREIGN PATENT DOCUMENTS

JP            04326140 A    11/1992

OTHER PUBLICATIONS

NB940259 (IBM Technical Disclosure Bulletin, Feb. 1994; vol. 37; pp 59-64).*

Brown, et al "Compiler-Based I/O Prefetching for Out-of-Core Applications", ACM Transactions on Computer Systems, vol. 19, No. 2, May 2001, pp. 111-170.

Wang, et al "Guided Region Prefetching: A Cooperative Hardware/Software Approach", pp. 388-398.

Natarajan, et al "A Study of Performance Impact of Memory Controller Features in Multi-Processor Server Environment", pp. 80-87.

Nilsen, "High-Level Dynamic Memory Management for Object-Oriented Real-Time Systems", pp. 86-93.

Benini, Luca, et al. "System-Level Power Optimization: Techniques and Tools", ACM Transactions on Design Automation of Electronic Systems, vol. 6, No. 2, Apr. 2001, pp. 149-206.

Massoud Pedram, "Power Minimization in IC Design Principles and Applications", ACM Transactions on Design Automation of Electronic Systems vol. 1, No. 1, Jan. 1996, pp. 3-56.

P.R. Panda, "Data and Memory Optimization Techiques For Embedded Systems", ACM Transactions on Design Automation of Electronic Systems, vol. 6, No. 2, Apr. 2001, pp. 149-206.

Penrod, Lee, "Understanding System Memory and CPU Speeds: A laymans guide to the Front Side Bus (FSB)", Dec. 28, 2005, Direction . Org, pp. 1-5, http://www.directron.com/directron/fsbguide.html.

U.S. Appl. No. 11/419,586, filed May 22, 2006. Robert Tremaine. "Systems and Methods for Providing Remote Pre-Fetch Buffers".

NB940259 (IBM Technical Disclosure Bulletin, Feb. 1994; vol. 37; pp. 59-64).

Singh, S., et al, "Bus Sparing for Fault-Tolerant System Design", IBM Technical Disclosure Bulletin, Dec. 1991, vol. 34, No. 71, pp. 117-118.

Boudon, et al, "Novel Bus Reconfiguration Scheme With Spare Lines", IBM Technical Disclosure Bulletin, May 1987, vol. 29, No. 12, pp. 1-3.

Wikipedia, Serial Communications, [online], [retrieved Apr. 10, 2007 from the Internet], http://en.wikipedia.org/wiki/Serial_communications, 3 pages.

* cited by examiner

SYSTEM, METHOD AND STORAGE MEDIUM FOR PROVIDING A SERIALIZED MEMORY INTERFACE WITH A BUS REPEATER

BACKGROUND OF THE INVENTION

The invention relates to memory subsystems and in particular, to providing a serialized memory interface with a bus repeater.

Computer memory subsystems have evolved over the years, but continue to retain many consistent attributes. Computer memory subsystems from the early 1980's, such as the one disclosed in U.S. Pat. No. 4,475,194 to LaVallee et al., of common assignment herewith, included a memory controller, a memory assembly (contemporarily called a basic storage module (BSM) by the inventors) with array devices, buffers, terminators and ancillary timing and control functions, as well as several point-to-point busses to permit each memory assembly to communicate with the memory controller via its own point-to-point address and data bus. FIG. 1 depicts an example of this early 1980 computer memory subsystem with two BSMs, a memory controller, a maintenance console, and point-to-point address and data busses connecting the BSMs and the memory controller.

FIG. 2, from U.S. Pat. No. 5,513,135 to Dell et al., of common assignment herewith, depicts an early synchronous memory module, which includes synchronous dynamic random access memories (DRAMs) 8, buffer devices 12, an optimized pinout, an interconnect and a capacitive decoupling method to facilitate operation. The patent also describes the use of clock re-drive on the module, using such devices as phase lock loops (PLLs).

FIG. 3, from U.S. Pat. No. 6,510,100 to Grundon et al., of common assignment herewith, depicts a simplified diagram and description of a memory subsystem 10 that includes up to four registered dual inline memory modules (DIMMs) 40 on a traditional multi-drop stub bus channel. The subsystem includes a memory controller 20, an external clock buffer 30, registered DIMMs 40, address bus 50, control bus 60 and a data bus 70 with terminators 95 on the address bus 50 and data bus 70.

FIG. 4 depicts a 1990's memory subsystem which evolved from the structure in FIG. 1 and includes a memory controller 402, one or more high speed point-to-point channels 404, each connected to a bus-to-bus converter chip 406, and each having a synchronous memory interface 408 that enables connection to one or more registered DIMMs 410. In this implementation, the high speed, point-to-point channel 404 operated at twice the DRAM data rate, allowing the bus-to-bus converter chip 406 to operate one or two registered DIMM memory channels at the full DRAM data rate. Each registered DIMM included a PLL, registers, DRAMs, an electrically erasable programmable read-only memory (EEPROM) and terminators, in addition to other passive components.

As shown in FIG. 5, memory subsystems were often constructed with a memory controller connected either to a single memory module, or to two or more memory modules interconnected on a 'stub' bus. FIG. 5 is a simplified example of a multi-drop stub bus memory structure, similar to the one shown in FIG. 3. This structure offers a reasonable tradeoff between cost, performance, reliability and upgrade capability, but has inherent limits on the number of modules that may be attached to the stub bus. The limit on the number of modules that may be attached to the stub bus is directly related to the data rate of the information transferred over the bus. As data rates increase, the number and length of the stubs must be reduced to ensure robust memory operation. Increasing the speed of the bus generally results in a reduction in modules on the bus, with the optimal electrical interface being one in which a single module is directly connected to a single controller, or a point-to-point interface with few, if any, stubs that will result in reflections and impedance discontinuities. As most memory modules are sixty-four or seventy-two bits in data width, this structure also requires a large number of pins to transfer address, command, and data. One hundred and twenty pins are identified in FIG. 5 as being a representative pincount.

FIG. 6, from U.S. Pat. No. 4,723,120 to Petty, of common assignment herewith, is related to the application of a daisy chain structure in a multipoint communication structure that would otherwise require multiple ports, each connected via point-to-point interfaces to separate devices. By adopting a daisy chain structure, the controlling station can be produced with fewer ports (or channels), and each device on the channel can utilize standard upstream and downstream protocols, independent of their location in the daisy chain structure.

FIG. 7 represents a daisy chained memory bus, implemented consistent with the teachings in U.S. Pat. No. 4,723,120. The memory controller 111 is connected to a memory bus 315, which further connects to module 310a. The information on bus 315 is re-driven by the buffer on module 310a to the next module, 310b, which further re-drives the bus 315 to module positions denoted as 310n. Each module 310a includes a DRAM 311a and a buffer 320a. The bus 315 may be described as having a daisy chain structure, with each bus being point-to-point in nature.

One drawback to the use of a daisy chain bus is that it increases the probability of a failure causing multiple memory modules to be affected along the bus. For example, if the first module is non-functional, then the second and subsequent modules on the bus will also be non-functional. Another drawback to the use of a daisy chain bus is that the memory latency of each memory module on the daisy chain varies based on the placement of the memory module in the daisy chain.

BRIEF SUMMARY OF THE INVENTION

Exemplary embodiments of the present invention include a packetized cascade memory system including a plurality of memory assemblies, a memory bus including multiple segments, a bus repeater module and a segment level sparing module. The bus repeater module is in communication with two or more of the memory assemblies via the memory bus. The segment level sparing module provides segment level sparing for the communication bus upon segment failure.

Additional exemplary embodiments include a method for providing a memory interface. The method includes receiving an input signal at a bus repeater module, the input signal from a memory bus including a plurality of segments. A mode associated with the bus repeater module is determined. Bits in the input signal are repositioned in response to one of the bits being associated with a failing segment. The input signal is then transmitted, via the memory bus, to one or more memory assemblies in response to the mode.

Further exemplary embodiments include a storage medium for providing a memory interface. The storage medium is encoded with machine readable computer program code and includes instructions for causing a computer to implement a method. The method includes receiving an input signal at a bus repeater module, the input signal from a memory bus including a plurality of segments. A mode associated with the bus repeater module is determined. Bits in the input signal are repositioned in response to one of the bits being associated with a failing segment. The input signal is then transmitted, via the memory bus, to one or more memory assemblies in response to the mode.

Still further exemplary embodiments include a packetized cascade communication system. The system includes a plurality of communication assemblies, a communication bus, a bus repeater module and a segment level sparing module. The communication bus includes multiple segments. The bus repeater module is in communication with two or more of the communication assemblies via the communication bus and the segment level sparing module provides segment level sparing for the communication bus upon segment failure.

Additional exemplary embodiments include a method for providing a communication interface. The method includes receiving an input signal at a bus repeater module, the input signal from a communication bus including a plurality of segments. A mode associated with the bus repeater module is determined. Bits in the input signal are repositioned in response to one of the bits being associated with a failing segment. The input signal is then transmitted, via the communication bus, to one or more communication assemblies in response to the mode.

Further exemplary embodiments include a storage medium for providing a communication interface. The storage medium is encoded with machine readable computer program code and includes instructions for causing a computer to implement a method. The method includes receiving an input signal at a bus repeater module, the input signal from a communication bus including a plurality of segments. A mode associated with the bus repeater module is determined. Bits in the input signal are repositioned in response to one of the bits being associated with a failing segment. The input signal is then transmitted, via the communication bus, to one or more communication assemblies in response to the mode.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Exemplary embodiments of the present invention provide a flexible, high speed and high reliability memory system architecture and interconnect structure that includes a single-ended, point-to-point interconnection between any two high speed interconnection interfaces. The memory subsystem may be implemented in one of several structures depending on desired attributes such as reliability, performance, density, space, cost, component reuse and other elements. Exemplary embodiments of the present invention include a memory controller, memory modules and a bus repeater situated between the memory controller and the memory modules (or between two or more memory modules). The use of a bus repeater module (also referred to as a bus repeater chip) permits an increase in the maximum operating length between the memory controller and the memory modules while reducing average memory latency by having a direct point-to-point connection to and from the memory modules. By utilizing a point-to-point bus structure, an error within a single memory module will not affect the functionality of other memory modules in the memory subsystem. The bus repeater module includes several switching modes and may be adapted to either buffered memory modules and/or directly connected to a memory controller via a packetized, multi-transfer interface with enhanced reliability features. In addition, the bus repeater module may be utilized with unbuffered and/or registered memory modules in conjunction with the identical buffer device, or an equivalent bus, programmed to operate in a manner consistent with the memory interface defined for those module types.

Figure 1:
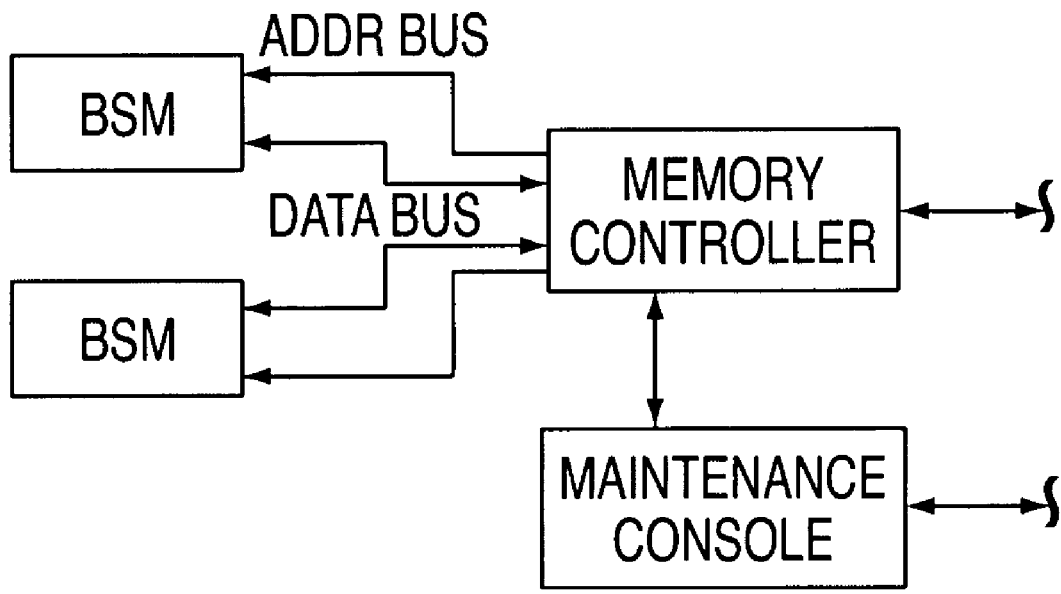
FIG. 1 depicts a prior art memory controller connected to two buffered memory assemblies via separate point-to-point links.
Figure 2:
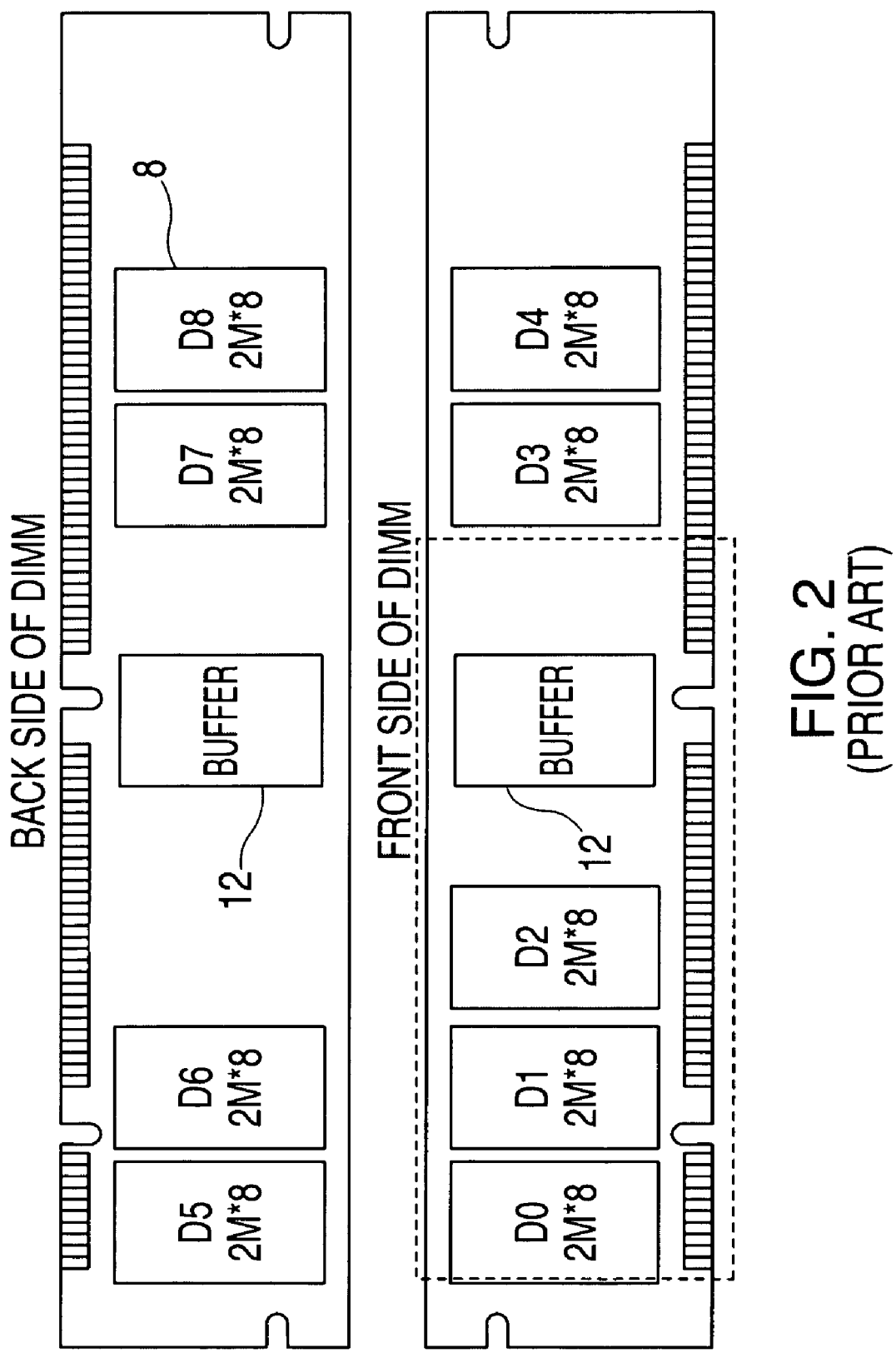
FIG. 2 depicts a prior art synchronous memory module with a buffer device.
Figure 3:
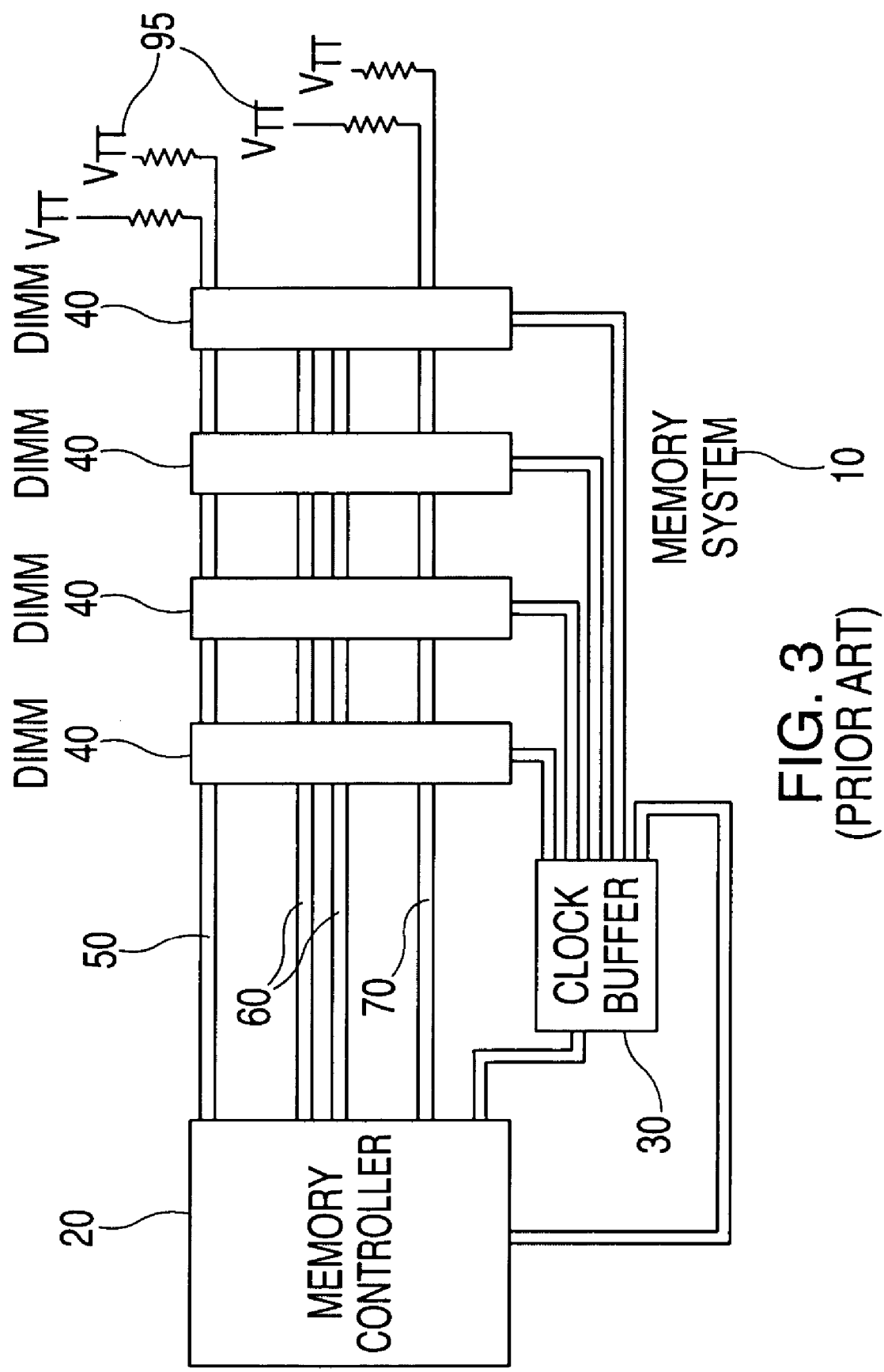
FIG. 3 depicts a prior art memory subsystem using registered DIMMs.
Figure 4:
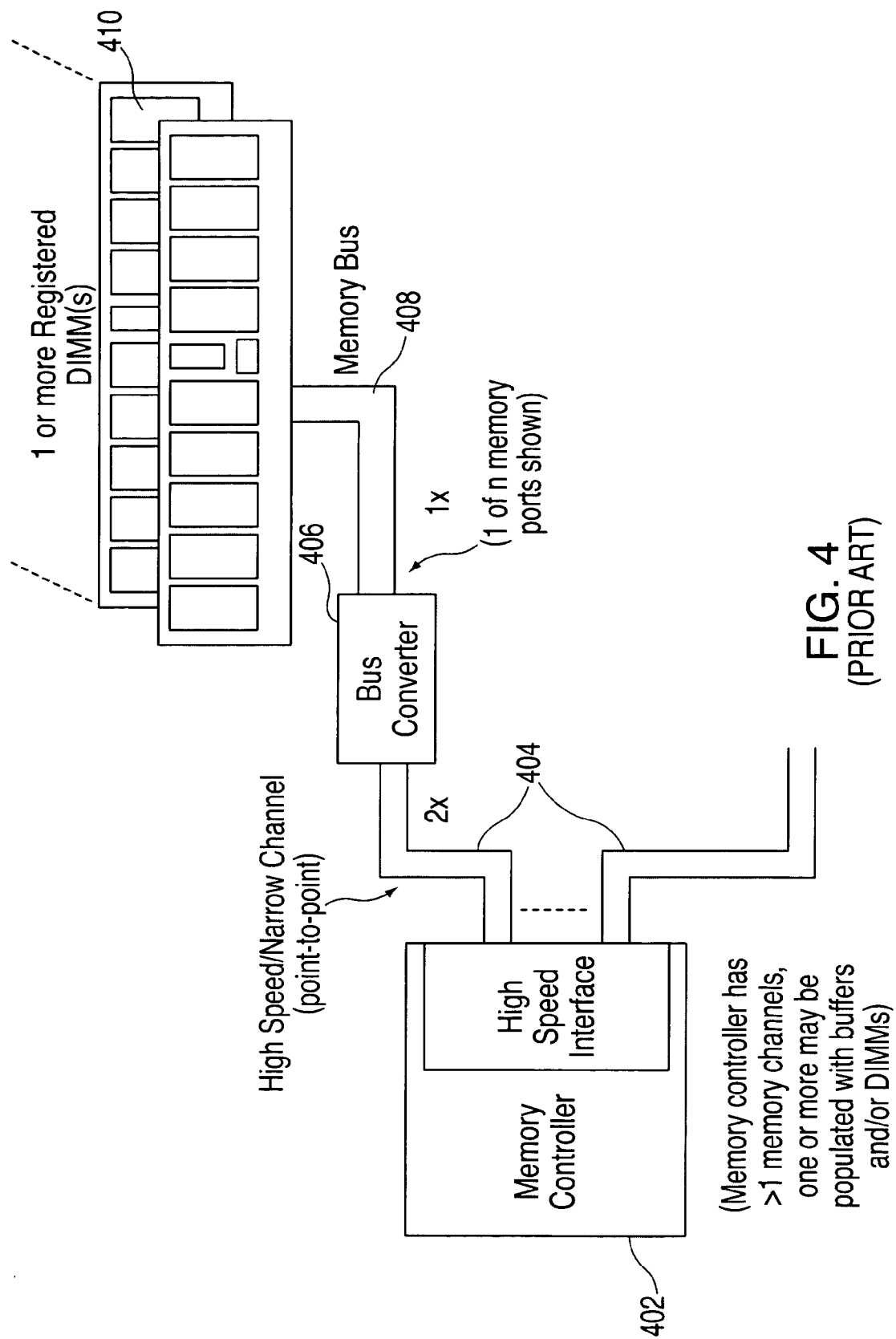
FIG. 4 depicts a prior art memory subsystem with point-to-point channels, registered DIMMs, and a 2:1 bus speed multiplier
Figure 5:
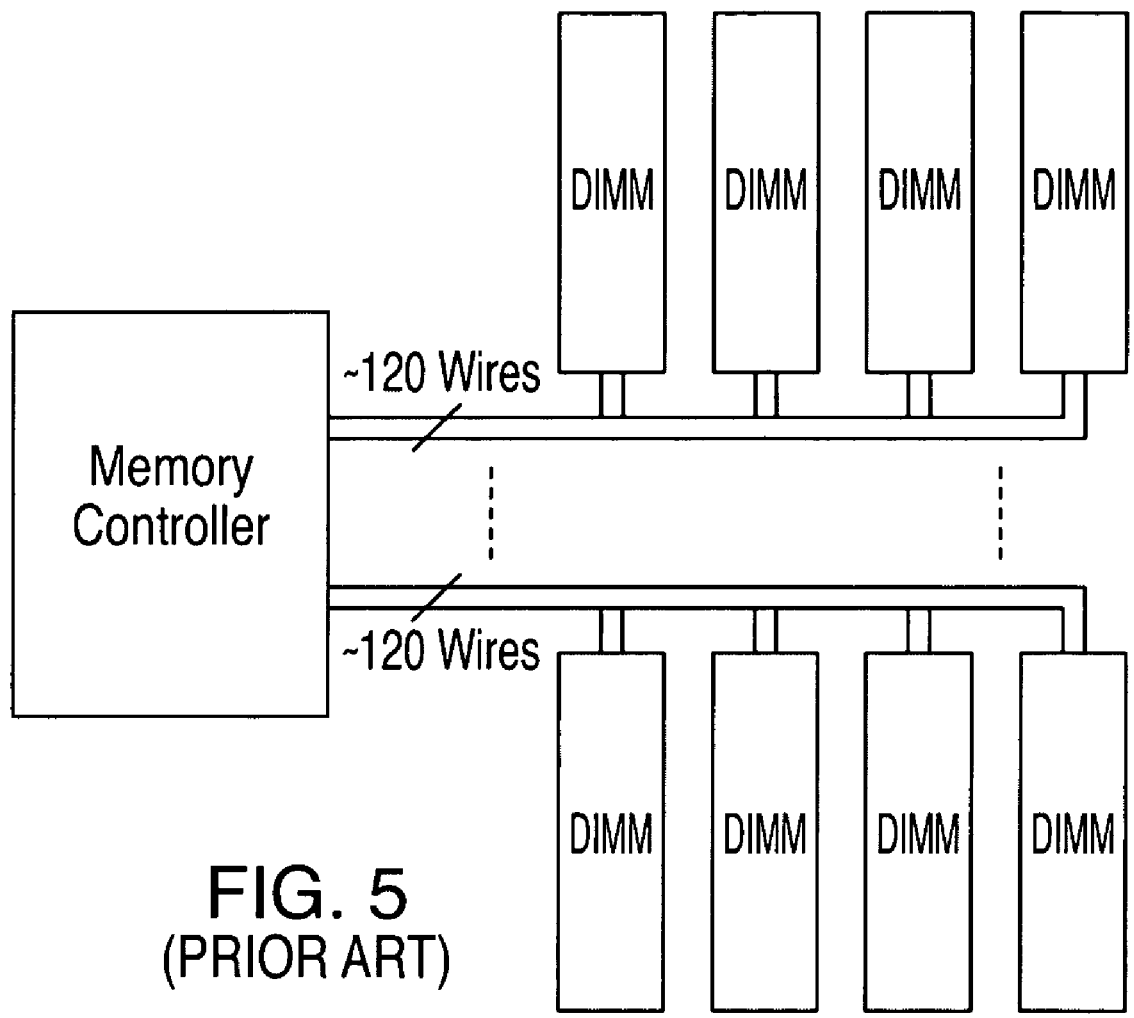
FIG. 5 depicts a prior art memory structure that utilizes a multidrop memory 'stub' bus.
Figure 6:
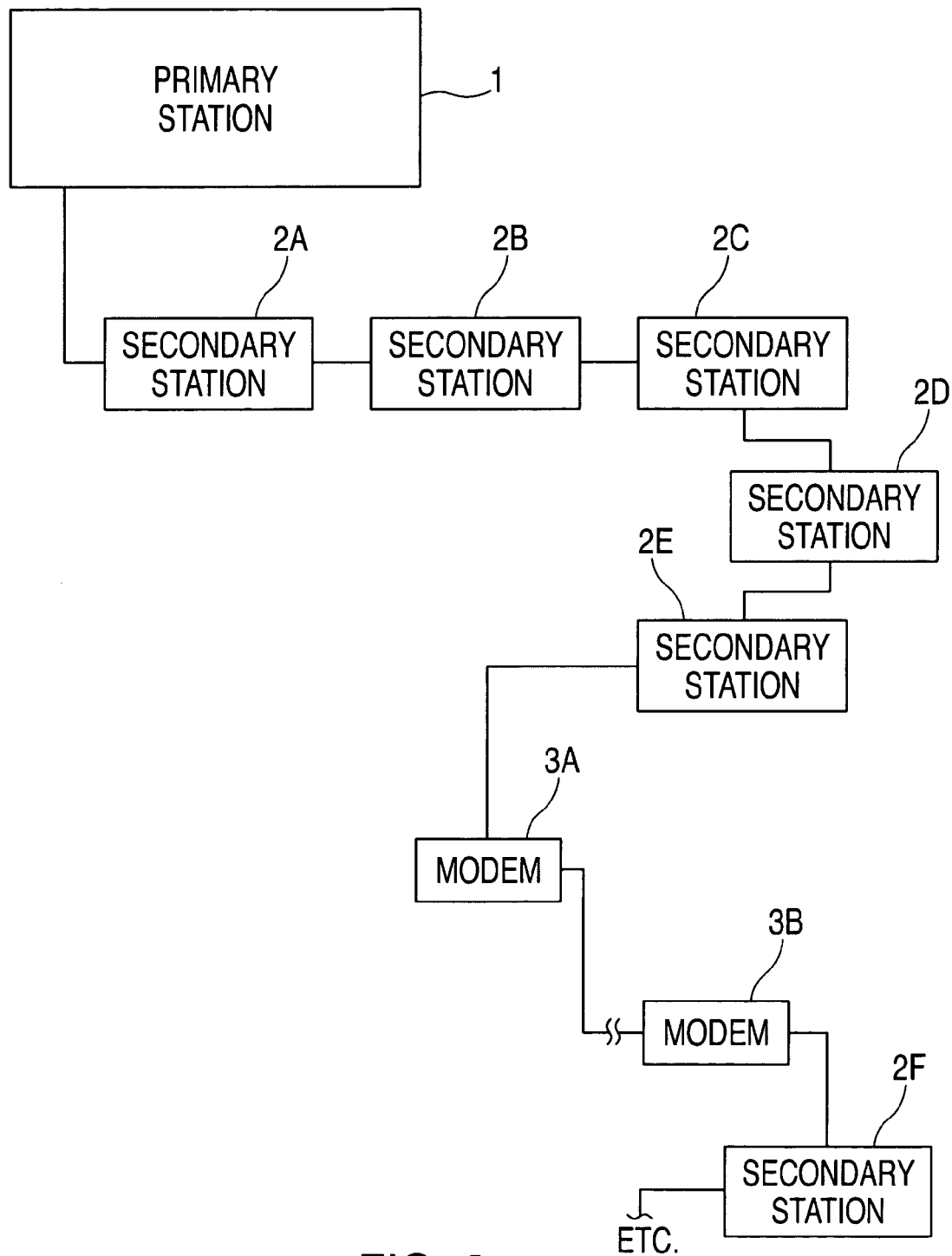
FIG. 6 depicts a prior art daisy chain structure in a multipoint communication structure that would otherwise require multiple ports.
Figure 7:
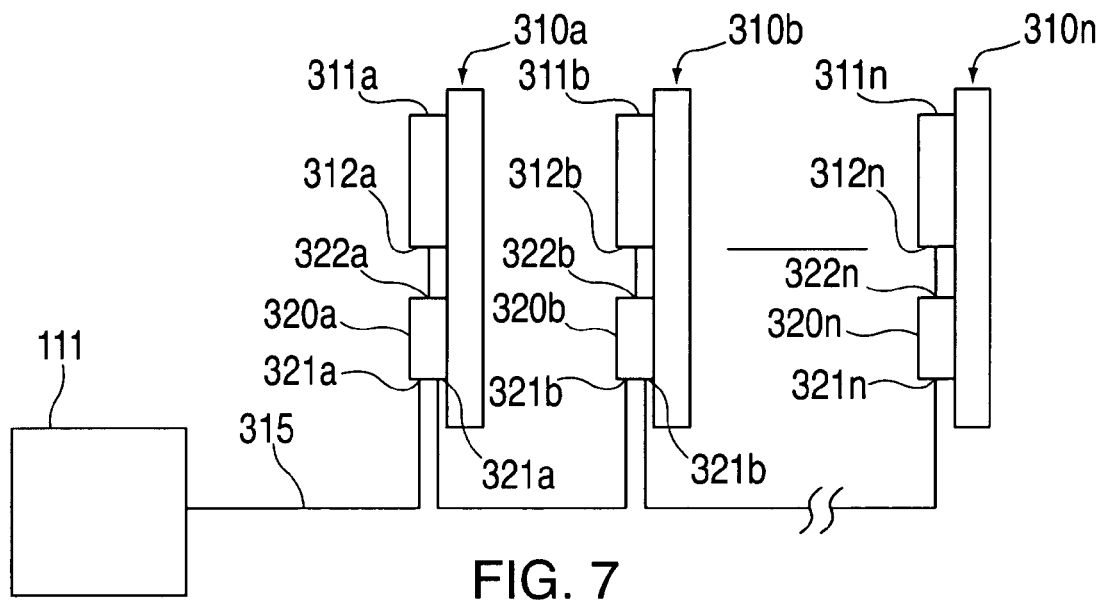
FIG. 7 depicts a prior art daisy chain connection between a memory controller and memory modules.
Figure 8:
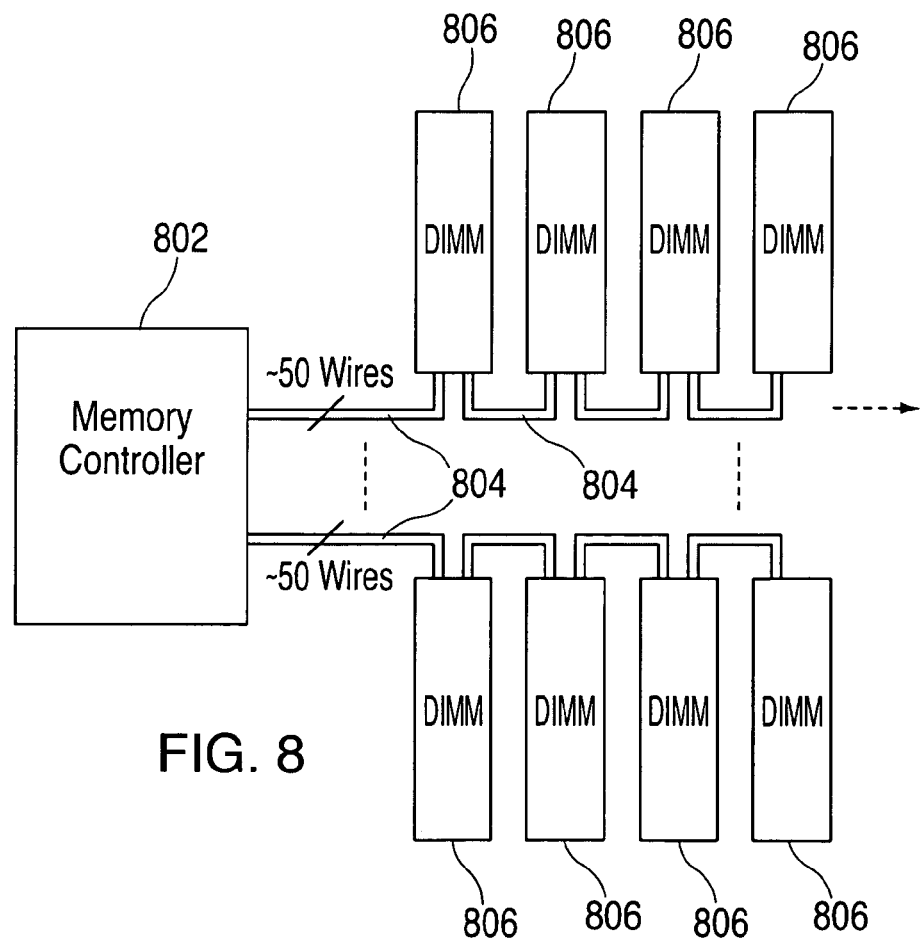
FIG. 8 depicts a cascaded memory structure that may be utilized by exemplary embodiments of the present invention.

FIG. 8 depicts a cascaded memory structure that may be utilized when buffered memory modules 806 (e.g., the buffer device is included within the memory module 806) are in communication with the memory controller 802. This memory structure includes a memory controller 802 in communication with one or more memory modules 806 via a high speed point-to-point bus 804. Each bus 804 in the exemplary embodiment depicted in FIG. 8 includes approximately fifty high speed wires for the transfer of address, command, data and clocks. By using point-to-point busses as described in the aforementioned prior art, it is possible to optimize the bus design to permit significantly increased data rates, as well as to reduce the bus pincount by transferring data over multiple cycles. Whereas FIG. 4 depicts a memory subsystem with a two to one ratio between the data rate on any one of the busses connecting the memory controller to one of the bus converters (e.g., to 1,066 Mb/s per pin) versus any one of the busses between the bus converter and one or more memory modules (e.g., to 533 Mb/s per pin), an exemplary embodiment of the present invention, as depicted in FIG. 8, provides a four to one bus speed ratio to maximize bus efficiency and minimize pincount.

Although point-to-point interconnects permit higher data rates, overall memory subsystem efficiency must be achieved by maintaining a reasonable number of memory modules 806 and memory devices per channel (historically four memory modules with four to thirty-six chips per memory module, but as high as eight memory modules per channel and as few as one memory module per channel). Using a point-to-point bus necessitates a bus re-drive function on each memory module, to permit memory modules to be cascaded such that each memory module is interconnected to other memory modules as well as to the memory controller 802.

Figure 9:
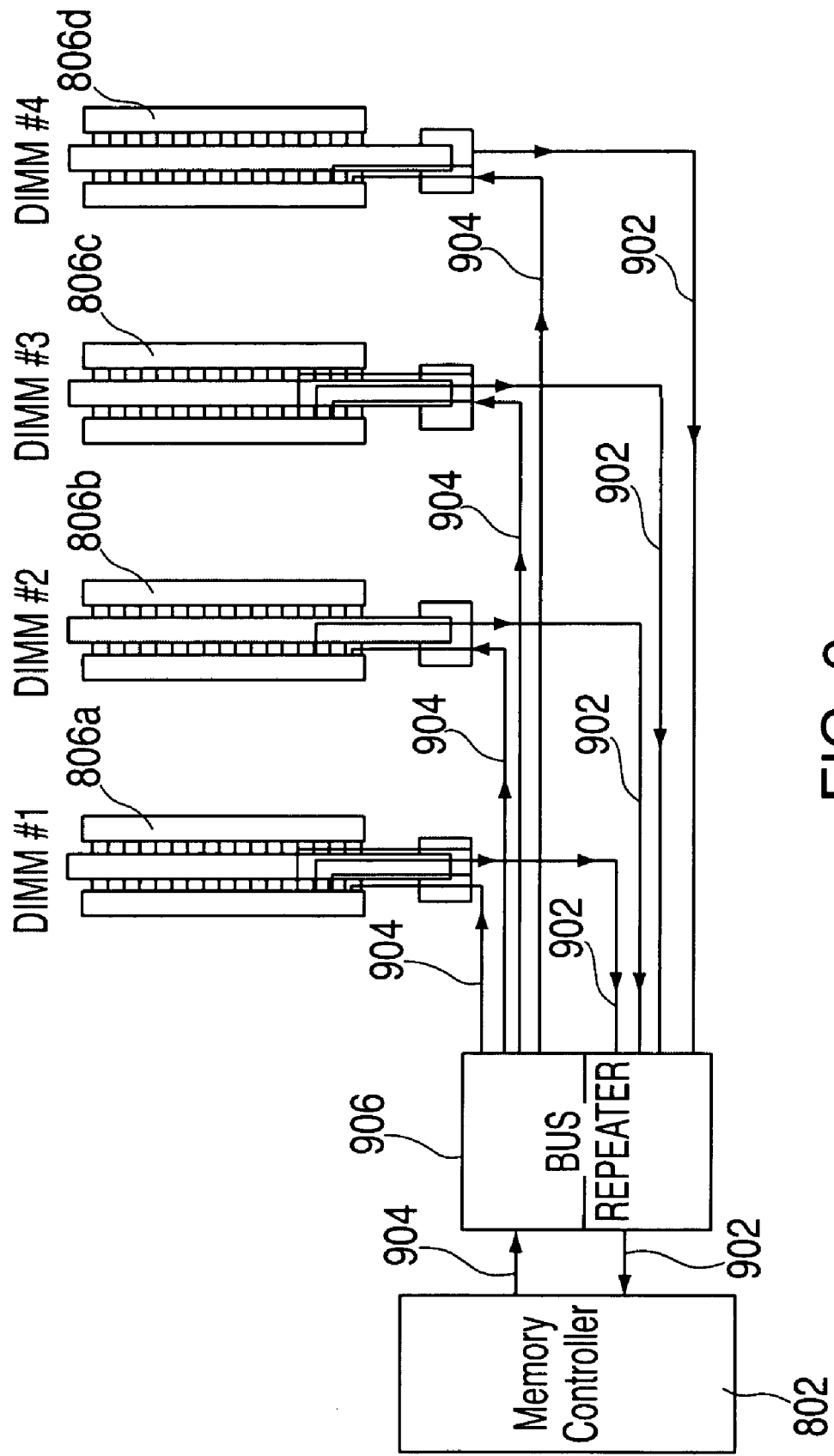
FIG. 9 depicts a memory structure with cascaded memory modules and unidirectional busses and a bus repeater that is utilized by exemplary embodiments of the present invention.
Figures 10, 11:
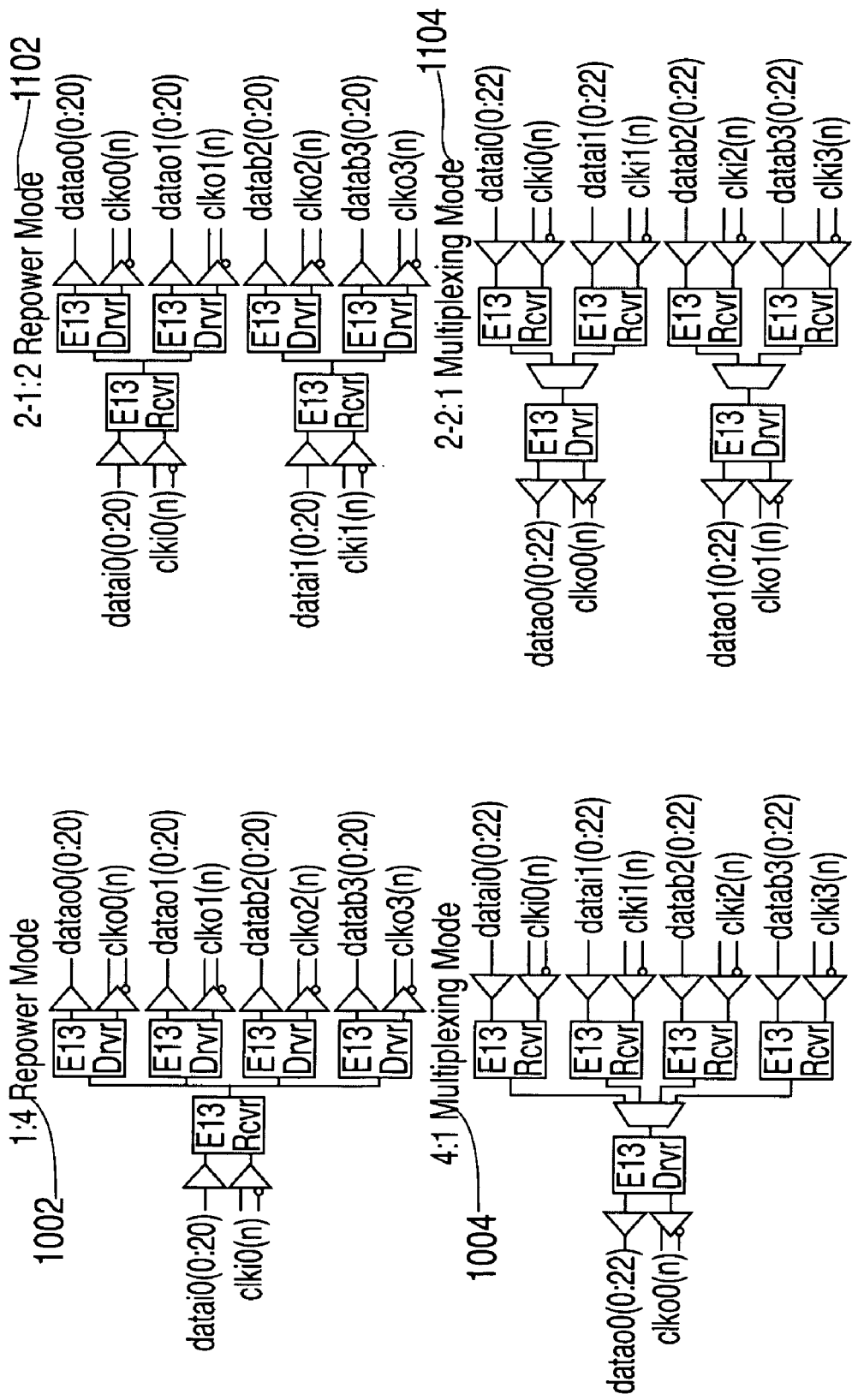
FIG. 10 is block diagram of a one to four repower mode and a four to one multiplexing mode that may be implemented by a bus repeater module in exemplary embodiments of the present invention.
FIG. 11 is a block diagram of a one to two repower mode and a two to one multiplexing mode that may be implemented by a bus repeater module in exemplary embodiments of the present invention.

FIG. 9 depicts a memory structure with memory modules, unidirectional busses and a bus repeater module that is utilized by exemplary embodiments of the present invention. FIG. 9 includes a bus repeater module 906 that is connected to a memory controller 802. The bus repeater module 906 is utilized to transmit signals on the memory bus to/from memory modules 806 within the memory structure. Exemplary embodiments of operating modes that may be implemented by the bus repeater module 906 are depicted in FIGS. 10 and 11. FIG. 9 also includes four memory modules 806a, 806b, 806c and 806d, on each of two memory busses (a downstream memory bus 904 and an upstream memory bus 902), connected to the bus repeater module 906 in a point to point manner.

An exemplary embodiment of the present invention includes two uni-directional busses between the memory controller 802 and the bus repeater module 906. The bus repeater module 906, in turn is directly connected to the memory modules 806a-d ("DIMM #1", "DIMM #2", "DIMM #3" and "DIMM #4") memory structure. The downstream memory bus 904 is comprised of twenty-two single-ended signals (including a signal for a spare bit) and a differential clock pair. The downstream memory bus 904 is used to transfer address, control, data and error code correction (ECC) bits downstream from the memory controller 802 to the bus repeater 906 (over several clock cycles) and then to one or more of the memory modules 806 installed on the cascaded memory channel. The upstream memory bus 902 is comprised of twenty-three single-ended signals (including a signal for a spare bit) and a differential clock pair, and is used to transfer bus-level data and ECC bits upstream from the sourcing memory module 806 to the memory controller 802, via the bus repeater 906. The memory busses include a plurality of segments (e.g., each wire, or signal, between the bus repeater module 906 and the memory modules 806a-d; and each wire, or signal, between the memory controller 802 and the bus repeater module 906). Using this memory structure, and a four to one data rate multiplier between the DRAM data rate (e.g., 400 to 800 Mb/s per pin) and the unidirectional memory bus data rate (e.g., 1.6 to 3.2 Gb/s per pin), the memory controller 802 signal pincount, per memory channel, is reduced from approximately one hundred and twenty pins to about fifty pins.

Utilizing the memory structure depicted in FIG. 9, the latency for each memory module 806 is symmetrical because each memory module 806 is connected to the bus repeater 906 in a point-to-point manner. In contrast, the latency in the cascaded memory structure depicted in FIG. 8 provides an increased latency, as compared to the structure in FIG. 9, for any memory modules 806 placed more than two drops away from the memory controller 802. In the event of an uncorrectable memory module 806 failure, any communication downstream from the failing module may not be possible due to the cascaded bus structure depicted in FIG. 8. In contrast, the memory structure depicted in FIG. 9, that includes the bus repeater module 906, prevents a faulty memory module 806 from impacting the continued operation of the remaining memory modules 806.

Further, the memory structure depicted in FIG. 9 allows for memory mirroring (parallel write and read operations to two memory modules 806 instead of one and completing read operations from the second memory module 806 if the first memory module 806 if found to have uncorrectable errors) to be supported without having to utilize non-symmetrical memory latency between the two memory modules 806. This is possible because the bus repeater module 906 has direct connections to each memory module 806. Still further, the memory structure depicted in FIG. 9, with the bus repeater 906 inserted between the memory controller 802 and the memory modules 806, increases the maximum bus length to permit support for memory module 806 that are a greater distance from the memory controller 802. This increase may be permitted because each channel segment could be at the maximum length allowed by the channel design, and multiple segments could be combined, via bus repeater modules 906, to achieve the required total length.

The bus repeater module 906 does not have to be in communication with the memory controller 802. In alternate exemplary embodiments of the present invention, the bus repeater module(s) 906 may be positioned between two memory modules in a cascaded memory structure (e.g., 806a and 806b, 806b and 806c, and 806c and 806d) and not between the memory controller 802 and each memory module 806a-d. In addition, a bus repeater module 906 may be positioned between one memory module 806 (e.g., 806a) and a plurality of other memory modules 806 (e.g., 806b-d). Further, the bus repeater module 906 may be implemented as a single unit as depicted in FIG. 9 or as a plurality of physical units. Other configurations are possible when implementing the bus repeater module 906 in conjunction with memory systems. For example, a memory system may include the downstream bus 904 depicted in FIG. 9 with a bus repeater module 906 and an upstream bus 902 implemented using the cascaded memory bus 804 depicted in FIG. 8 (i.e., no bus repeater module 906). In another example, a memory system includes the upstream bus 902 depicted in FIG. 9 with a bus repeater module 906 and a downstream bus 904 implemented using the cascaded memory bus 804 depicted in FIG. 8 (i.e., no bus repeater module 906).

In alternate exemplary embodiments of the present invention, the memory controller 802 in FIG. 9 may be replaced with a communication assembly (e.g., a communication controller), the upstream bus 902 and downstream bus 904 bus may be replaced with a communication medium (e.g., one or more communication busses) and the memory modules 806a-d replaced with communication assemblies. The memory controller 802 may be replaced with a communication assembly such as a transmitter (implemented, for example, by a communication controller). The transmitter may be utilized to encode and transmit a message via the communication medium. The communication medium may be implemented by cable, wire, voice, and/or any other method of transport. The memory modules 806a-d may be replaced with receivers (implemented, or example, by communication controllers). The receiver may be utilized to receive messages from the communication medium and then to decode the messages. In alternate exemplary embodiments the transmitter also performs receiver functions and the receiver also performs transmitter functions.

FIG. 10 is block diagram of a one to four repower mode 1002 and a four to one multiplexing mode 1004 that may be implemented by a bus repeater module 906 in exemplary embodiments of the present invention. Referring to the one to four repower mode 1002, the memory controller 802 initiates an operation to one or more memory modules 806 located downstream from the memory controller 802 via the downstream bus 904. The downstream bus 904 is then repowered by the bus repeater 906 to four identical copies of the downstream data bus 904 (datao0, datao1, datao2 and datao3). All downstream memory modules 806 will monitor the downstream data bus 904 to see if the data are targeted for them. The targeted memory module 806 will receive and act on the received information, while the rest of the memory modules 806 will ignore the data once the error checking and command decoding indicates that the access is not intended for them. This mode provides uniform memory latency among all memory modules 806 since all of the memory modules 806 have a direct point-to-point connection to the bus repeater (s) 906. In the event of an uncorrectable error on one or more of the memory modules 806, the rest of the memory modules 806 will still be in operational mode because of the point to point connections.

Referring to the four to one multiplexing mode 1004, the memory modules 806 are supplying the data (datai0, datai1, datai2 and datai3) and the bus repeater 906 multiplexes the data onto one upstream bus 902 (datao0) toward the memory controller 802. Again, memory latency is uniform among all memory modules 806. In the event of an uncorrectable error on one or more of the memory modules 806, given that there are point-to-point connections to all memory modules 806 from the bus repeater 906, the rest of the memory modules 806 will still be operational. The use of the one to four repower mode and the four to one multiplexing mode are complimentary, in that a system would generally use both operating modes to create a memory system with read and write capability.

FIG. 11 is a block diagram of a one to two repower mode and a two to one multiplexing mode that may be implemented by a bus repeater module 906 in exemplary embodiments of the present invention. Referring to the one to two repower mode 1102, there are physically two separate one to two repowering functions. This structure allows the memory controller 802 to operate twice as many downstream busses 904 (datai0 and datai1) as compared to only one downstream bus 904 (datai0) in a conventional mode, while keeping uniform memory latency. This mode may also serve as a memory mirroring solution by having the memory controller 802 supply the same data source (datai0 and datai1 respectively) to two memory modules 806, thereby replicating the data across datao0, datao1, datao2 and datao3. In another embodiment, the memory controller 802 may supply two separate data sources (where datai0 and datai1 are not the same) which are repowered onto datao0, datao1 for datai0 and onto datao2 and datao3 for dataa1. In the event of an uncorrectable error on one or more of the memory modules 806, given that there are point-to-point connections to all memory modules 806 from the bus repeater 906, the rest of the memory modules 806 will still be operational.

Referring to the two to one multiplexing mode 1104 depicted in FIG. 11, the memory modules 806 are supplying the datai0 and datai1 which are multiplexed onto datao0 while the datai2 and datai3 are multiplexed onto datao1. This provides increased bandwidth as compared to the four to one multiplexor mode, with the same uniform memory latency toward the memory controller 802. Memory mirroring can be utilized in this structure whereas the memory controller 802 would choose from datao0 and datao1. In the event of an uncorrectable error on one or more of the memory modules 806, given that there are point-to-point connections to all memory modules 806 from the bus repeater module 906, the rest of the memory modules 806 will still be operational. All four switching modes depicted in FIGS. 10 and 11 may be utilized for data mirroring and/or for increasing memory bus bandwidth. The mirroring schemes and modes described herein intended to be examples and other mirroring schemes may be implemented with exemplary embodiments of the present invention. For example, referring to FIG. 10, memory mirroring may be implemented by replicating the single data source into four identical copies to provide quadruple redundancy for selected mission critical applications.

Figure 12:
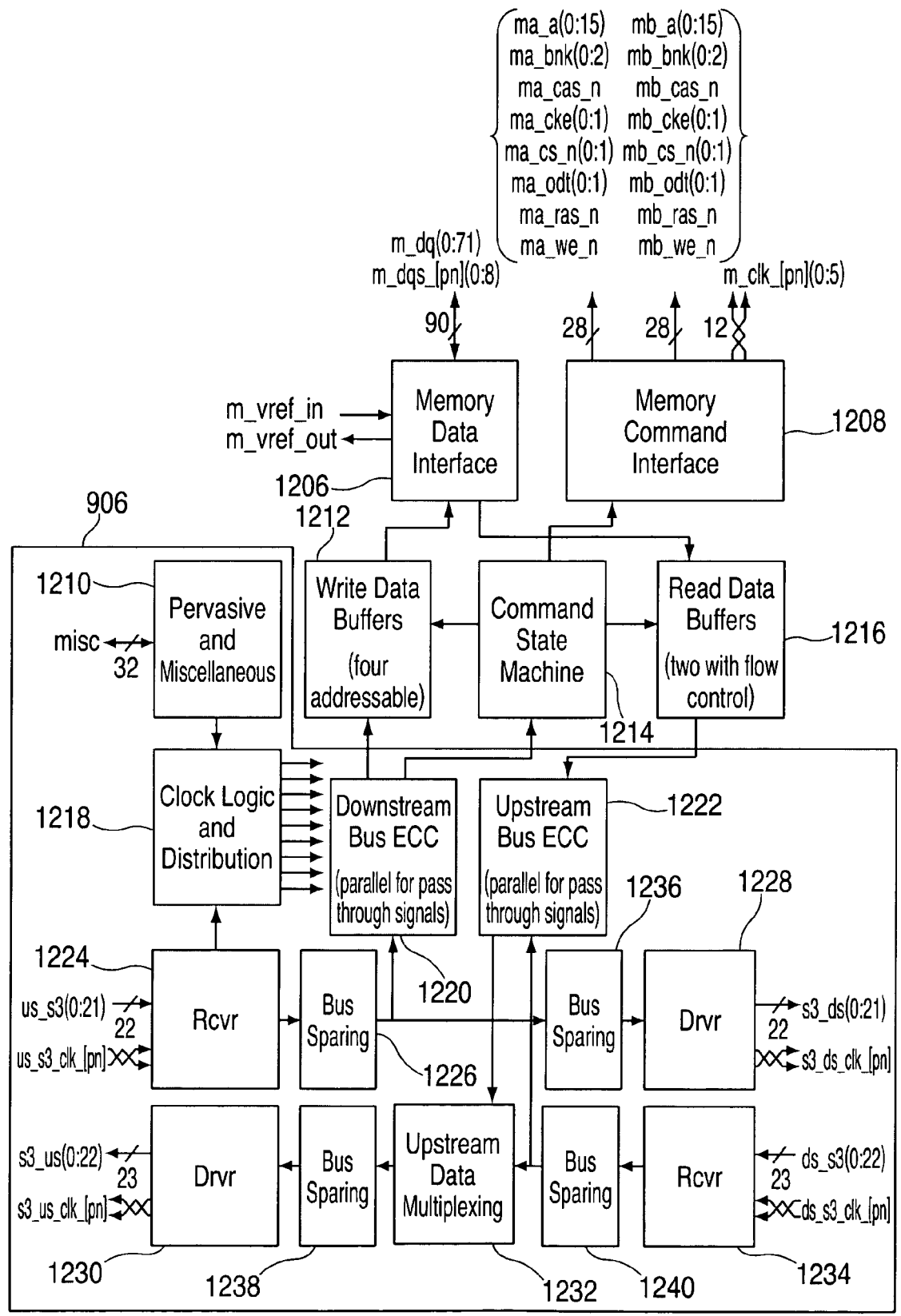
FIG. 12 is a block diagram of a bus repeater module high level logic flow as utilized by exemplary embodiments of the present invention.

FIG. 12 is a block diagram of the high level logic flow of a bus repeater module 906 that may be implemented by exemplary embodiments of the present invention to provide segment level sparing and/or other enhanced functionality. The bus repeater module 906 may be located on a memory module 806 as described previously and/or located on a system board or card. The blocks in the lower left and right portions of the drawing (1224, 1228, 1230, 1234) are associated with receiving or driving the high speed bus 804. "Upstream" refers to the bus 902 passing information in the direction of the memory controller 802, and "downstream" refers to the bus 904 passing information away from the memory controller 802.

Referring to FIG. 12, data, command, address, ECC, and clock signals from an upstream memory assembly (i.e., a memory module 806), a memory controller 802 and/or a bus repeater module 906 are received from the downstream memory bus 904 into a receiver module 1224. The receiver functional block 1224 provides macros and support logic for the downstream memory bus 904 and, in an exemplary embodiment of the present invention includes support for a twenty-two bit, high speed, slave receiver bus. The receiver functional block 1224 transmits the clock signals to a clock logic and distribution functional block 1218 (e.g., to generate the four to one clock signals). The clock logic and distribution functional block 1218 also receives data input from the pervasive and miscellaneous signals 1210. These signals typically include control and setup information for the clock distribution PLL's, test inputs for BIST (built-in self-test) modes, programmable timing settings, etc. The receiver functional block 1224 transfers the data, command, ECC and address signals to a bus sparing logic block 1226 to reposition, when applicable, the bit placement of the data in the event that a spare wire utilized during the transmission from the previous memory assembly. In an exemplary embodiment of the present invention, the bus sparing logic block 1226 is implemented by a multiplexor to shift the signal positions, if needed. Next, the original or re-ordered signals are input to another bus sparing logic block 1236 to modify, or reorder if necessary, the signal placement to account for any defective interconnect that may exist between the current memory assembly and a downstream memory assembly. The original or re-ordered signals are then input to a driver functional block 1228 for transmission, via the downstream memory bus 904, to the next memory module 806 in the chain. In an exemplary embodiment of the present invention, the bus sparing logic 1236 is implemented using a multiplexor. The driver functional block 1228 provides macros and support logic for the downstream memory bus 904 and, in an exemplary embodiment of the present invention, includes support for the twenty-two bit, high speed, low latency cascade bus drivers.

In addition to inputting the original or re-ordered signals to the bus sparing logic 1236, the bus sparing logic 1226 also inputs the original or re-ordered signals into a downstream bus ECC functional block 1220 to perform error detection and correction for the frame. The downstream bus ECC functional block 1220 operates on any information received or passed through the bus repeater module 906 from the downstream memory bus 904 to determine if a bus error is present. The downstream bus ECC functional block 1220 analyzes the bus signals to determine if it they are valid. Next, the downstream bus ECC functional block 1220 transfers the corrected signals to a command state machine 1214. The command state machine 1214 inputs the error flags associated with command decodes or conflicts to a pervasive and miscellaneous functional block 1210. The downstream and upstream modules also present error flags and/or error data (if any) to the pervasive and miscellaneous functional block 1210 to enable reporting of these errors to the memory controller, processor, service processor or other error management unit.

Referring to FIG. 12, the pervasive and miscellaneous functional block 1210 transmits error flags and/or error data to the memory controller 802. By collecting error flags and/or error data from each memory module 806 in the structure, the memory controller 802 will be able to identify the failing segment(s), without having to initiate further diagnostics, though additional diagnostics may be completed in some embodiments of the design. In addition, once an installation selected threshold (e.g., one, two, ten, or twenty) for the number of failures or type of failures has been reached, the pervasive and miscellaneous functional block 1210, generally in response to inputs from the memory controller 802, may substitute the spare wire for the segment that is failing. In an exemplary embodiment of the present invention, error detection and correction is performed for every group of four transfers, thereby permitting operations to be decoded and initiated after half of the eight transfers, comprising a frame, are received. The error detection and correction is performed for all signals that pass through the memory module 806 from the downstream memory bus 904, regardless of whether the signals are to be processed by the particular memory module 806. The data bits from the corrected signals are input to the write data buffers 1212 by the downstream bus ECC functional block 1220.

The command state machine 1214 also determines if the corrected signals (including data, command and address signals) are directed to and should be processed by the memory module 806. If the corrected signals are directed to the memory module 806, then the command state machine 1214 determines what actions to take and may initiate DRAM action, write buffer actions, read buffer actions or a combination thereof. Depending on the type of memory module 806 (buffered, unbuffered, registered), the command state machine 1214 selects the appropriate drive characteristics, timings and timing relationships. The write data buffers 1212 transmit the data signals to a memory data interface 1206 and the command state machine 1214 transmits the associated addresses and command signals to a memory command interface 1208, consistent with the DRAM specification. The memory data interface 1206 reads from and writes memory data 1242 to a memory device. The data timing relationship to the command is different depending on the type of memory module 806. For example, when the memory data interface 1206 issues a command to a registered DIMM memory module 804, the command takes an extra clock cycle as compared to a command issued to an unbuffered DIMM memory module 806. In addition, the memory command interface 1208 outputs six differential clocks on twelve wires. To support the use of both unbuffered and registered memory modules 806, the memory a outputs 1204 and the memory b outputs 1202 from the memory command interface 1208 can be logically configured based on the type of memory module 806. For example, when the multi-mode memory device is in communication with two unbuffered DIMM memory modules 806, the memory a outputs 1204 may be directed to the first unbuffered DIMM memory module 806 and the memory b outputs 1202 may be directed to the second unbuffered DIMM memory module 806.

Data signals to be transmitted to the memory controller 802 may be temporarily stored in the read data buffers 1216 after a command, such as a read command, has been executed by the memory module 806, consistent with the memory device 'read' timings. The read data buffers 1216 transfer the read data into an upstream bus ECC functional block 1222. The upstream bus ECC functional block 1222 generates check bits for the signals in the read data buffers 1216. The check bits and signals from the read data buffers 1216 are input to the upstream data multiplexing functional block 1232. The upstream data multiplexing functional block 1232 merges the data on to the upstream memory bus 902 via the bus sparing logic 1238 and the driver functional block 1230. If needed, the bus sparing logic 1238 may re-direct the signals to account for a defective segment between the current memory module 806 and the upstream receiving module (or memory controller). The driver functional block 1230 transmits the original or re-ordered signals, via the upstream memory bus 902, to the next memory assembly (i.e., memory module 806) or memory controller 802 in the chain. In an exemplary embodiment of the present invention, the bus sparing logic 1238 is implemented using a multiplexor to shift the signals. The driver functional block 1230 provides macros and support logic for the upstream memory bus 902 and, in an exemplary embodiment of the present invention, includes support for a twenty-three bit, high speed, low latency cascade driver bus.

Data, clock and ECC signals from the upstream memory bus 902 are also received by any upstream bus repeater module 906 in any upstream memory module 806. These signals need to be passed upstream to the next memory module 806 or to the memory controller 802. Referring to FIG. 12, data, ECC and clock signals from a downstream memory assembly (i.e., a memory module 806) are received on the upstream memory bus 902 into a receiver functional block 1234. The receiver functional block 1234 provides macros and support logic for the upstream memory bus 902 and, in an exemplary embodiment of the present invention includes support for a twenty-three bit, high speed, slave receiver bus. The receiver functional block 1234 passes the data and ECC signals, through the bus sparing functional block 1240, to the upstream data multiplexing functional block 1232 and then to the bus sparing logic block 1238. The signals are transmitted to the upstream memory bus 902 via the driver functional block 1230.

In addition to passing the data and ECC signals to the upstream data multiplexing functional block 1232, the bus sparing functional block 1240 also inputs the original or re-ordered data and ECC signals to the upstream bus ECC functional block 1222 to perform error detection and correction for the frame. The upstream bus ECC functional block 1222 operates on any information received or passed through the bus repeater module 906 from the upstream memory bus 902 to determine if a bus error is present. The upstream bus ECC functional block 1222 analyzes the data and ECC signals to determine if they are valid. Next, the upstream bus ECC functional block 1222 transfers any error flags and/or error data to the pervasive and miscellaneous functional block 1210 for transmission to the memory controller 802. In addition, once a pre-defined threshold for the number or type of failures has been reached, the pervasive and miscellaneous functional block 1210, generally in response to direction of the memory controller 802, may substitute the spare segment for a failing segment.

The block diagram in FIG. 12 is one implementation of a bus repeater module 906 that may be utilized by exemplary embodiments of the present invention. The bus repeater module 906 depicted in FIG. 12 provides segment level sparing and bus level ECC. Other implementations are possible without departing from the scope of the present invention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A packetized cascade memory system comprising:
   a memory controller;
   one or more memory assemblies;
   a cascaded memory bus comprising multiple segments and a spare segment in parallel with the multiple segments;
   a bus repeater module in communication with the memory controller and one or more of the memory assemblies via the memory bus or in communication with two or more of the memory assemblies via the memory bus; and
   a segment level sparing module to provide segment level sparing for the memory bus upon segment failure, the segment level sparing including substituting the spare segment for a failing segment in the multiple segments.

2. The memory system of claim 1 wherein one or more of a segment between the bus repeater module and a memory assembly and a segment between the bus repeater module and the memory controller may be replaced with the spare segment.

3. The memory system of claim 1 wherein the memory assemblies operate at a memory assembly data rate and the memory bus operates at four times the memory assembly data rate.

4. The memory system of claim 1 further comprising a bus level error code fault detection and correction module to provide bus level error code fault detection and correction.

5. The memory system of claim 1 wherein one of the memory assemblies is a buffered memory module.

6. The memory system of claim 1 wherein one of the memory assemblies is an unbuffered memory module.

7. The memory system of claim 1 wherein one of the memory assemblies is a registered memory module.

8. The memory system of claim 1 wherein the bus repeater re-drives identical copies of data on the memory bus to two or more memory assemblies.

9. The memory system of claim 1 wherein the memory bus further comprises a differential clock pair.

10. A packetized cascade communication system comprising:
    a plurality of communication assemblies;
    a cascaded communication bus comprising multiple segments and a spare segment in parallel with the multiple segments;
    a bus repeater module in communication with two or more of the communication assemblies via the communication bus; and
    a segment level sparing module to provide segment level sparing for the communication bus upon segment failure, the segment level sparing including substituting the spare segment for a failing segment in the multiple segments.

11. The communication system of claim 10 wherein a segment between the bus repeater module and a communication assembly may be replaced with the spare segment.

12. The communication system of claim 10 wherein the communication assemblies operate at a communication assembly data rate and the communication bus operates at four times the communication assembly data rate.

13. The communication system of claim 10 further comprising a bus level error code fault detection and correction module to provide bus level error code fault detection and correction.

14. The communication system of claim 10 wherein one or more of the communication assemblies is a communication controller.

15. The communication system of claim 10 wherein one or more of the communication assemblies includes a receiver.

16. The communication system of claim 10 wherein one or more of the communication assemblies includes a transmitter.

17. The communication system of claim 10 wherein one or more of the communication assemblies includes a receiver and a transmitter.

18. The communication system of claim 10 wherein the bus repeater re-drives identical copies of data on the communication bus to two or more communication assemblies.

19. The communication system of claim 10 wherein the communication bus further comprises a differential clock pair.

20. The communication system of claim 10 wherein each segment is a single wire or signal.

21. A packetized cascade memory system comprising:
a memory controller;
one or more memory assemblies;
a cascaded memory bus comprising multiple segments and a spare segment in parallel with the multiple segments, each segment being a single wire or signal;
a bus repeater module in communication with the memory controller and one or more of the memory assemblies via the memory bus or in communication with two or more of the memory assemblies via the memory bus; and
a segment level sparing module to provide segment level sparing for the memory bus upon segment failure, the segment level sparing including substituting the spare segment for a failing segment in the multiple segments.

* * * * *